(12) United States Patent
Amann et al.

(10) Patent No.: US 7,511,714 B1
(45) Date of Patent: Mar. 31, 2009

(54) VIDEO FORMAT CONVERSION USING 3D GRAPHICS PIPELINE OF A GPU

(75) Inventors: Garry W. Amann, Austin, TX (US); Stephen Lew, Sunnyvale, CA (US); Sanford S. Lum, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/705,144

(22) Filed: Nov. 10, 2003

(51) Int. Cl.
*G09G 5/02* (2006.01)

(52) U.S. Cl. ............... 345/603; 345/581; 345/538; 345/585; 345/601; 345/604; 345/660; 382/162; 348/548

(58) Field of Classification Search ......... 345/603–605, 345/506, 419, 582, 589, 591, 600, 608, 609, 345/611, 581, 585, 538, 601, 660; 348/441–446, 348/448, 453, 454, 458, 459, 548; 382/162
See application file for complete search history.

(56) References Cited

U.S. PATENT DOCUMENTS

| | | | |
|---|---|---|---|
| 5,631,849 A | 5/1997 | Wallace | |
| 5,953,691 A * | 9/1999 | Mills | 702/198 |
| 6,525,728 B2 | 2/2003 | Kamen et al. | |
| 6,538,658 B1 * | 3/2003 | Herrera | 345/600 |
| 6,825,851 B1 * | 11/2004 | Leather | 345/584 |
| 6,828,987 B2 * | 12/2004 | Swan | 345/660 |
| 6,958,780 B1 * | 10/2005 | Kawai | 348/458 |
| 7,317,827 B2 * | 1/2008 | Munsil | 382/162 |
| 2002/0145610 A1 * | 10/2002 | Barilovits et al. | 345/538 |
| 2003/0030653 A1 | 2/2003 | Swan | |
| 2003/0189581 A1 * | 10/2003 | Nasoff et al. | 345/660 |
| 2003/0201994 A1 | 10/2003 | Taylor et al. | |
| 2003/0234795 A1 * | 12/2003 | Lee | 345/601 |
| 2004/0119886 A1 * | 6/2004 | Cook et al. | 348/453 |
| 2004/0246257 A1 * | 12/2004 | MacInnis et al. | 345/503 |
| 2007/0070083 A1 * | 3/2007 | Fouladi et al. | 345/604 |

* cited by examiner

*Primary Examiner*—Kimbinh T Nguyen

(57) ABSTRACT

Video conversion using a 3D graphics pipeline of a graphical processing unit (GPU) is disclosed. A plurality of video data formatted in a first video format is accessed from a memory unit. Moreover, the plurality of video data is converted from the first video format to a second video format using a 3D graphics pipeline of the GPU. The plurality of video data formatted in the second video format is sent to the memory unit. The 3D graphics pipeline applies a filtering technique. In an embodiment, the filtering technique is an interpolation technique.

16 Claims, 8 Drawing Sheets

| 4:2:0 NV12 VIDEO FORMAT | |
|---|---|
| YYYY YYYY<br>YYYY YYYY<br>YYYY YYYY<br>YYYY YYYY | UVUV UVUV<br>UVUV UVUV |

FIGURE 2A

| 4:2:0 YV12 VIDEO FORMAT | | |
|---|---|---|
| YYYY YYYY<br>YYYY YYYY<br>YYYY YYYY<br>YYYY YYYY | VV VV<br>VV VV | UU UU<br>UU UU |

FIGURE 2B

PHYSICAL LOCATION OF LUMA(Y) AND CHROMA(U,V) IN MEMORY

```
4:2:2 YUY 2
VIDEO FORMAT

YUYVYUYV  YUYVYUYV
YUYVYUYV  YUYVYUYV
YUYVYUYV  YUYVYUYV
YUYVYUYV  YUYVYUYV
```

FIGURE 3A

```
4:2:2 UYVY
VIDEO FORMAT

UYVYUYVY  UYVYUYVY
UYVYUYVY  UYVYUYVY
UYVYUYVY  UYVYUYVY
UYVYUYVY  UYVYUYVY
```

FIGURE 3B

PHYSICAL LOCATION OF LUMA(Y) AND CHROMA(U,V) IN MEMORY

VIDEO FORMAT CONVERSION USING 3D GRAPHICS PIPELINE OF A GPU

BACKGROUND OF THE INVENTION

1. Field of the Invention

Embodiments of the present invention generally relate to video format conversion. More particularly, embodiments of the present invention relate to performing video format conversion using a 3D graphics pipeline of a graphical processing unit (GPU).

2. Related Art

There are several types of video formats. In particular, YUV video formats are widely used, where Y represents brightness (or luma) while U and V represent color (or chroma). More particular, U (or Cb) represents a color difference value formed by subtracting brightness (Y) from the color blue while V (or Cr) represents a color difference value formed by subtracting brightness (Y) from the color red.

Examples of YUV video formats include the 4:2:0 video formats and the 4:2:2 video formats. The primary difference between these video formats is the number of chroma samples for each luma sample. The 4:2:0 video formats have one U (or Cb) chroma sample and one V (Cr) chroma sample for every four Y (or luma) samples. The 4:2:2 video formats have one U (or Cb) chroma sample and one V (Cr) chroma sample for every two Y (or luma) samples. As a result, a pixel in the 4:2:0 video format is defined differently than a pixel in the 4:2:2 video format because of the difference in chroma samples for every luma sample in these two video format.

When converting from a 4:2:0 video format to a 4:2:2 video format, typically an upsampling technique is utilized. An example of an upsampling technique is replication. Replication is a process that can be used to increase the size of an image by repeating or duplicating pixels (to increase the horizontal size) and/or lines (to increase the vertical size) or to increase the display rate of a video stream by repeating or duplicating frames. For example, a 360×240 pixel image can be displayed at 720×480 size by duplicating each pixel on each line and then duplicating each line. Similarly, a 24 frames per second video signal can be displayed at 72 frames per second by repeating each frame three times.

For converting a 4:2:0 video format to a 4:2:2 video format using replication, the chroma samples of the 4:2:0 video format are duplicated or repeated such that one U (or Cb) chroma sample and one V (Cr) chroma sample exist for every two Y (or luma) samples rather than one U (or Cb) chroma sample and one V (Cr) chroma sample for every four Y (or luma) samples.

However, when converting from a 4:2:2 video format to a 4:2:0 video format, typically a downsampling technique is utilized. An example of a downsampling technique is decimation. Decimation is a process used to reduce sampled data, usually by an integer factor. Typically, existing samples (pixels, in the case of spatial decimation, or pictures, in the case of temporal decimation) are discarded. The resulting sampled data is reduced in size.

For converting a 4:2:2 video format to a 4:2:0 video format using decimation, chroma samples of the 4:2:2 video format are discarded such that one U (or Cb) chroma sample and one V (Cr) chroma sample exist for every four Y (or luma) samples rather than one U (or Cb) chroma sample and one V (Cr) chroma sample for every two Y (or luma) samples.

The development of the graphical processing unit (GPU) has enabled the offloading from the central processing unit (CPU) onto the GPU computationally intensive calculations associated with graphics. Moreover, the GPU is being utilized to perform the conversion between 4:2:2 video format and 4:2:0 video format. Typically, the GPU uses a dedicated conversion unit that is specifically designed into the GPU to perform specific video format conversions. Generally, the video format conversion is performed by applying replication for upsampling and decimation for downsampling. Replication and decimation are simpler techniques to execute than other filtering techniques available. Thus, by using replication and decimation, the dedicated conversion unit can perform the video format conversion much faster compared to using other filtering techniques. Moreover, when other components of the GPU are utilized to perform the video format conversion using replication, decimation, or another type of filtering technique, the results are usually unsatisfactory because the bandwidth (or video processing capability) of these components is smaller than the required bandwidth for practical video format conversion applications.

The dedicated conversion unit reduces the amount of chip space on the GPU for other components and can usually perform only specific video format conversions. Moreover, the dedicated conversion unit is typically designed to receive the video data from a video memory, perform the video format conversion, and send the converted video data directly to the display. The dedicated conversion unit is usually not designed to return the converted video data to the video memory for further processing. Additionally, decimation and replication usually lead to improper color fidelity, distortion, and other artifacts that are visually perceptible, reducing video quality.

SUMMARY OF THE INVENTION

Video conversion using a 3D graphics pipeline of a graphical processing unit (GPU) is disclosed. A plurality of video data formatted in a first video format is accessed from a memory unit. Moreover, the plurality of video data is converted from the first video format to a second video format using a 3D graphics pipeline of the GPU. The plurality of video data formatted in the second video format is sent to the memory unit. The 3D graphics pipeline applies a filtering technique. In an embodiment, the filtering technique is an interpolation technique.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 2A illustrates a physical representation of a 4:2:0 NV12 video format in memory in accordance with an embodiment of the present invention.

FIG. 2B illustrates a physical representation of a 4:2:0 YV12 video format in memory in accordance with an embodiment of the present invention.

FIG. 3A illustrates a physical representation of a 4:2:2 YUY2 video format in memory in accordance with an embodiment of the present invention.

FIG. 3B illustrates a physical representation of a 4:2:2 UYVY video format in memory in accordance with an embodiment of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Figure 1A:
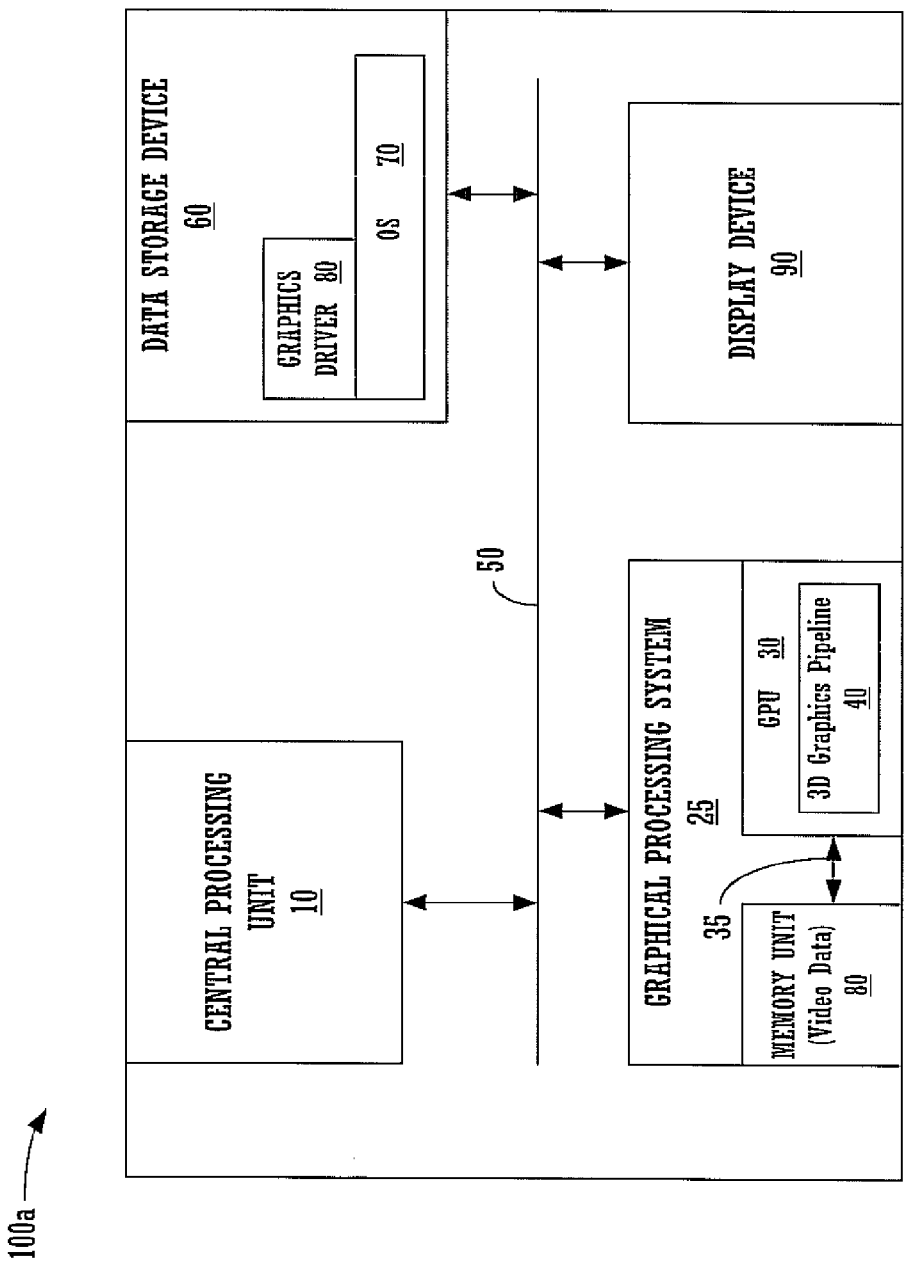
FIG. 1A illustrates a system in accordance with an embodiment of the present invention.

FIG. 1A illustrates a system 100A in accordance with an embodiment of the present invention. The system 100A includes a central processing unit 10, a bus 50, a graphical processing system 25, a display device 90, and a data storage device 60. The data storage device 60 includes a graphics driver 80 and an operating system 70. Moreover, the data storage device 60 can include one or more applications. The data storage device 60 can be any type of computer-readable medium that stores computer-executable instructions, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

The graphical processing system 25 includes a memory unit 20 and a graphical processing unit (GPU) 30. The memory unit 20 stores video data, which is converted from one format to another format by the GPU 30, as described below. The GPU 30 is coupled to the CPU 10 via bus 50. Moreover, the GPU 30 is coupled to the memory unit 20 via line 35. In this embodiment, the graphics driver 80 (executed by the CPU 10) controls the graphical processing system 25 and the GPU 30. The graphics driver 80 provides the control commands to the GPU 30 to perform the video format conversion, as described below.

Figure 1B:
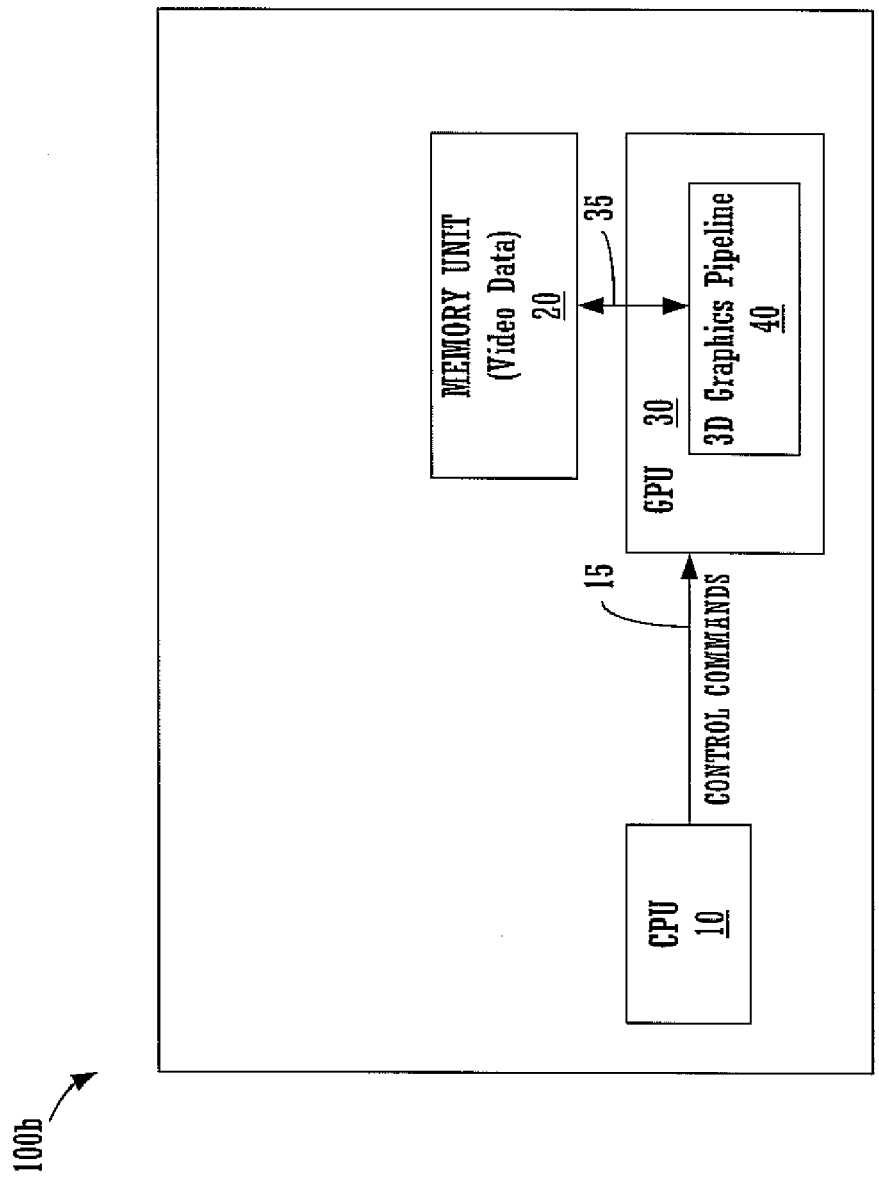
FIG. 1B illustrates a system in accordance with another embodiment of the present invention.

FIG. 1B illustrates a system 100B in accordance with another embodiment of the present invention. The system 100B includes a central processing unit (CPU) 10, a graphical processing unit (GPU) 30, and a memory unit 20. The memory unit 20 stores video data, which is converted from one format to another format by the GPU 30 as described below. The GPU 30 is coupled to the CPU 10 via line 15. Moreover, the GPU 30 is coupled to the memory unit 20 via line 35.

System 100A and system 100B can be implemented in several different configurations. Examples of these configurations include a computer system, a workstation, a DVD player, a game console, a graphics chipset, and a graphics card.

The following description is applicable to system 100A (FIG. 1A) and to system 100B (FIG. 1B).

The GPU 30 (e.g., in system 100A and in system 100B) includes a 3D graphics pipeline 40. The 3D graphics pipeline 40 is configured to perform 3D operations to create realistic looking environments that are visible through the 2D screen of a display device 90 (FIG. 1A). Examples of these 3D operations are transform, lighting, setup and clipping, rendering, texturing, etc. It should be understood that the GPU 30 can have other components (not all shown), such a display interface (42), a memory interface (41), a 2D graphics pipeline, etc.

Rather than having a dedicated conversion unit, the GPU 30 utilizes the 3D graphics pipeline 40 to perform video format conversions. The 3D graphics pipeline 40 provides a range of flexibility that enables the video format conversion to be performed in the 3D graphics pipeline 40. Moreover, recent advancements and improvements in the 3D graphics pipeline 40 have outpaced the advancements and improvements in other components of the GPU 30. Additionally, the 3D graphics pipeline 40 is not limited to a few video format conversions as in the case of the dedicated conversion unit. A greater variety of video format conversions can be performed by the 3D graphics pipeline 40. Moreover, the 3D graphics pipeline 40 has a flexible filtering capability that is well suited for video format conversion. Instead of using replication for upsampling and decimation for downsampling, the 3D graphics pipeline 40 applies a particular filtering technique to achieve upsampling and to achieve downsampling. In an embodiment, the 3D graphics pipeline 40 applies an interpolation technique to both upsampling and downsampling. Further, the 3D graphics pipeline 40 can perform the video format conversions using interpolation faster than other components and the dedicated conversion unit can perform the video format conversions using replication and decimation. As a result of using the interpolation technique, there is a visually perceptible improvement in video quality when the video data is displayed on a display device 90 (FIG. 1A). Other filtering techniques can be applied by the 3D graphics pipeline 40.

Although the present discussion will focus on the conversion from 4:2:0 (NV12/YV12) video format to 4:2:2 (YUY2/UYVY) video format, and from 4:2:2 (YUY2/UYVY) video format to 4:2:0 (NV12/YV12) video format, the 3D graphics pipeline 40 is well suited for other types of video format conversions.

FIG. 2A illustrates a physical representation of a 4:2:0 NV12 video format in memory in accordance with an embodiment of the present invention. In particular, the Y luma samples are separated from the UV chroma samples. Moreover, the U chroma samples are interleaved with the V chroma samples.

FIG. 2B illustrates a physical representation of a 4:2:0 YV12 video format in memory in accordance with an embodiment of the present invention. As depicted in FIG. 2B, the Y luma samples are separated from the UV chroma samples. Moreover, the U chroma samples are separated from the V chroma samples.

FIG. 3A illustrates a physical representation of a 4:2:2 YUY2 video format in memory in accordance with an embodiment of the present invention. As shown in FIG. 3A, the Y luma samples are interleaved with the UV chroma samples.

FIG. 3B illustrates a physical representation of a 4:2:2 UYVY video format in memory in accordance with an embodiment of the present invention. Similar to FIG. 3A, the Y luma samples are interleaved with the UV chroma samples.

Figure 4:
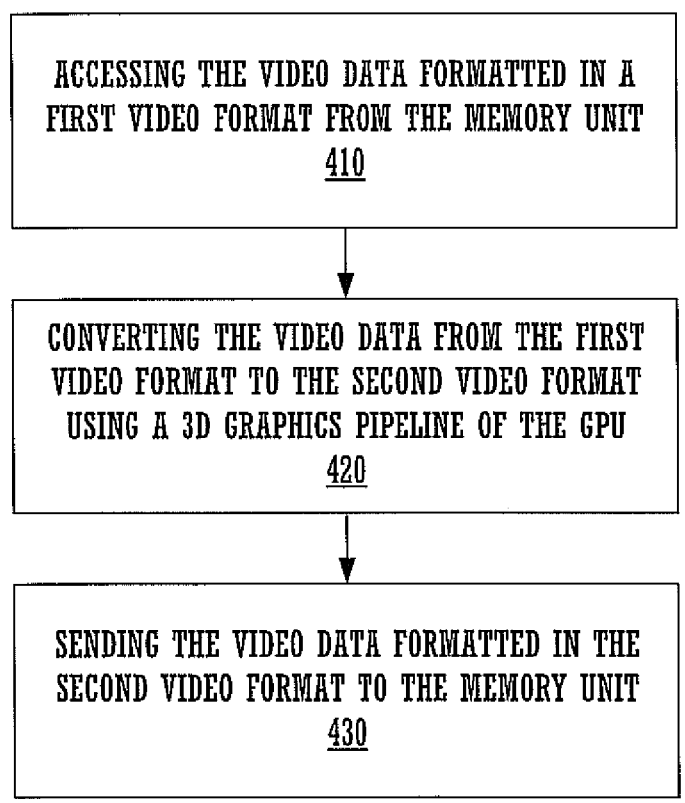
FIG. 4 illustrates a flowchart showing a method of performing video format conversion with a graphical processing unit (GPU) in accordance with an embodiment of the present invention.

FIG. 4 illustrates a flowchart showing a method 400 of performing video format conversion with a graphical processing unit (GPU) in accordance with an embodiment of the present invention. Reference is made to FIGS. 1A-3B and 5-6.

At Step 410, the GPU 30 accesses video data formatted in a first video format from the memory unit 20. The GPU 30 receives control commands to perform the video format conversion from the CPU 10. A graphics driver 80 (executed by the CPU 10) can provide the control commands received by the GPU 30. In an embodiment, the present invention is implemented as computer-executable instructions for performing this method 400. The computer-executable instructions can be stored in any type of computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

Moreover, at Step 420, the 3D graphics pipeline 40 receives the video data formatted in the first video format and converts the video data from the first video format to a second video format. As described above, the 3D graphics pipeline 40 applies an interpolation technique to the video data, whereas the interpolation technique is applied to achieve upsampling and to achieve downsampling. While FIG. 5 shows the interpolation technique for converting from a 4:2:0 video format to a 4:2:2 video format, FIG. 6 shows the interpolation technique for converting from a 4:2:2 video format to a 4:2:0 video format.

Furthermore, at Step 430, the video data formatted in the second video format is sent to the memory unit 20. These step (410-430) are repeated until the plurality of video data in the first video format in the memory unit 20 is converted to the second video format.

As described above, the 4:2:0 video formats have one U (or Cb) chroma sample and one V (Cr) chroma sample for every four Y (or luma) samples. The 4:2:2 video formats have one U (or Cb) chroma sample and one V (Cr) chroma sample for every two Y (or luma) samples.

Figure 5:
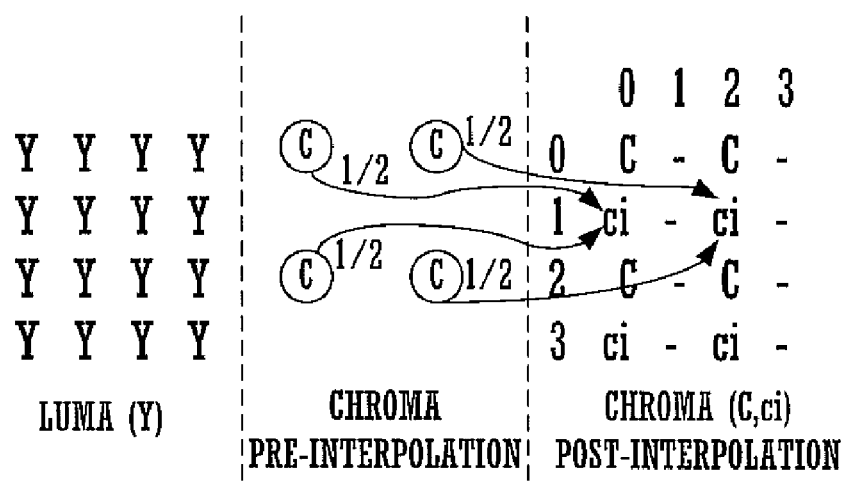
FIG. 5 illustrates an interpolation technique for converting from a 4:2:0 video format to a 4:2:2 video format in accordance with an embodiment of the present invention.
Figure 6:
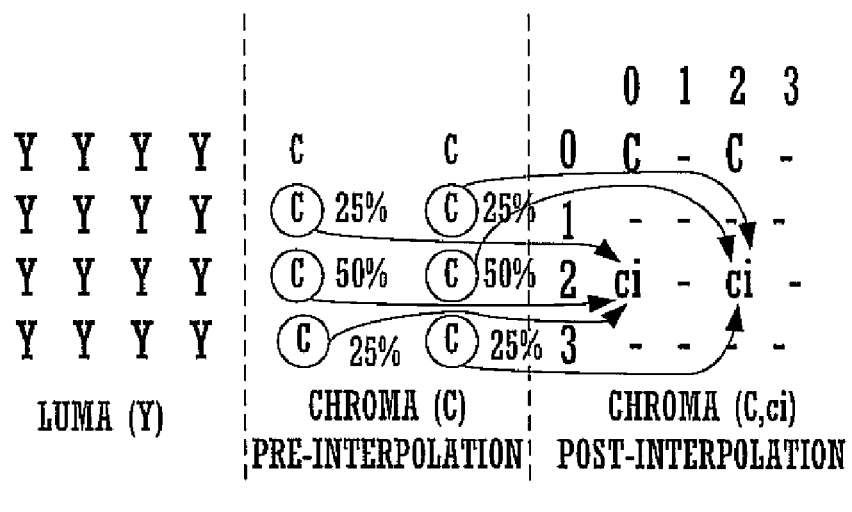
FIG. 6 illustrates an interpolation technique for converting from a 4:2:2 video format to a 4:2:0 video format in accordance with an embodiment of the present invention.

FIG. 5 illustrates an interpolation technique for converting from a 4:2:0 video format to a 4:2:2 video format in accordance with an embodiment of the present invention. It should be understood that other interpolation techniques can be utilized. As discussed above, converting from a 4:2:0 video format to a 4:2:2 video format requires an upsampling process. The logical arrangement of Y luma, the C chroma pre-interpolation, and the C,Ci chroma post-interpolation are shown in FIG. 5, whereas C represents the U,V pair and Ci represents the interpolated Ui,Vi pair. As depicted in FIG. 5, rows 1 and 3 are interpolated vertically. That is, Ci is calculated by using half of the C chroma sample that is located above Ci and half of the C chroma sample that is located below the Ci. As a result, there is a visually perceptible improvement in video quality when the video data is displayed on a display device 90 (FIG. 1A).

FIG. 6 illustrates an interpolation technique for converting from a 4:2:2 video format to a 4:2:0 video format in accordance with an embodiment of the present invention. It should be understood that other interpolation techniques can be utilized. As discussed above, converting from a 4:2:2 video format to a 4:2:0 video format requires a downsampling process. The logical arrangement of Y luma, the C chroma pre-interpolation, and the C,Ci chroma post-interpolation are shown in FIG. 6, whereas C represents the U,V pair and Ci represents the interpolated Ui,Vi pair. As depicted in FIG. 6, all rows except the bottom row and the top row are interpolated. That is, Ci is calculated by using 25% of the C chroma sample that is located above Ci, 50% of the C chroma sample that is located on the same line as Ci, and 25% of the C chroma sample that is located below the Ci. As a result, there is a visually perceptible improvement in video quality when the video data is displayed on a display device 90 (FIG. 1A).

Figure 7:
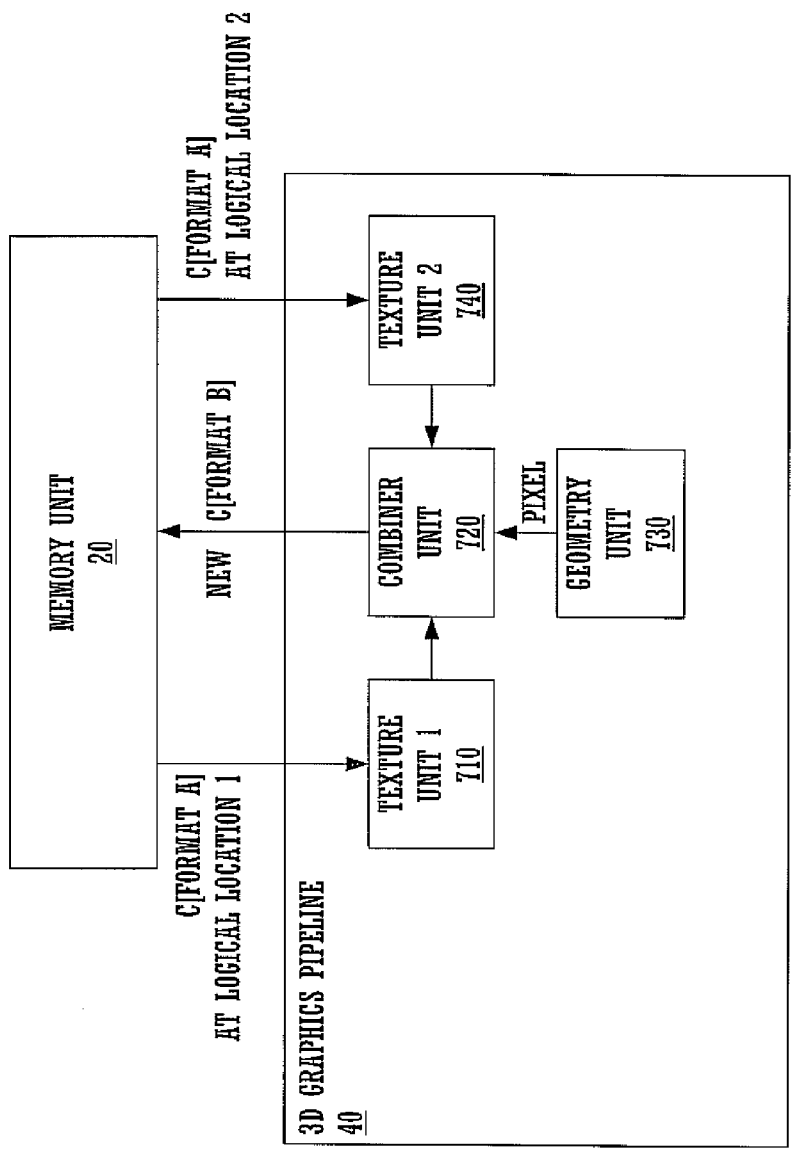
FIG. 7 illustrates operation of a 3D graphics pipeline and a memory unit in accordance with an embodiment of the present invention.

Operation of a 3D graphics pipeline 40 and a memory unit 20 in accordance with an embodiment of the present invention is shown in FIG. 7. It should be understood that the 3D graphics pipeline 40 can have other configurations. As depicted in FIG. 7, the 3D graphics pipeline 40 includes texture unit1 710, a combiner unit 720, texture unit2 740, and a geometry unit 730. Here, the video data is converted from format A to format B.

In practice, C (or UV) chroma samples from different logical locations (See FIGS. 5 and 6) of video data in format A are filtered to create a new C chroma sample for video data in format B. As described above, the new C chroma sample is obtained by applying an interpolation technique to the C chroma samples from the video data in format A. For instance, the texture unit1 710 receives a C chroma sample (in format A) from a logical location (e.g., logical location 1) from the memory unit 20. Similarly, the texture unit2 740 receives a C chroma sample (in format A) from another logical location (e.g., logical location 2) from the memory unit 20. The geometry unit 730 organizes the geometry into pixels. After filtering (e.g., an interpolation technique) and processing by texture unit1 710, texture unit2 740, and the combiner unit 720, the new C chroma sample for the video data in format B is outputted by the combiner unit 720 to the memory unit 20.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of performing video format conversion with a graphical processing unit (GPU), said method comprising:
    accessing a plurality of video data formatted in a first video format from a memory unit, wherein said GPU comprises a 3D graphics pipeline operable to perform 3D operations, and a memory interface;
    converting said plurality of video data from said first video format to a second video format using said 3D graphics pipeline of said GPU, wherein said video data is not scaled prior to said converting; and
    sending said plurality of video data formatted in said second video format to said memory unit.

2. The method as recited in claim 1 wherein said converting includes:
    applying a filtering technique.

3. The method as recited in claim 2 wherein said filtering technique is an interpolation technique.

4. The method as recited in claim 3 wherein said plurality of video data includes a plurality of luma data and a plurality of chroma data, and wherein said converting includes applying said interpolation technique to said chroma data.

5. The method as recited in claim 1 wherein said first and second video formats are YUV video formats.

6. The method as recited in claim 5 wherein said first video format is one of a 4:2:0 video format and a 4:2:2 video format.

7. The method as recited in claim 5 wherein said second video format is one of a 4:2:0 video format and a 4:2:2 video format.

8. The method as recited in claim 5 wherein said first video format is a 4:2:0 video format.

9. The method as recited in claim 5 wherein said second video format is a 4:2:2 video format.

10. A method of converting a video format using a graphical processing unit (GPU), said method comprising:
    receiving a plurality of video data in a first format from a memory unit, wherein said GPU comprises a graphics pipeline operable to perform 3D operations, and wherein said plurality of video data in said first format is un-scaled;
    determining a second video format for said plurality of video data, wherein said second video format is a desired video format;
    in response to said first video format and said second video format, converting said plurality of video data from said first video format to said second video format; and
    transmitting said plurality of video data in said second format to said memory unit.

11. The method as recited in claim 10 wherein said converting includes:
    applying a filtering technique.

12. The method as recited in claim 11 wherein said filtering technique is an interpolation technique.

13. The method as recited in claim 12 wherein said plurality of video data comprises a plurality of luma data and a plurality of chroma data, and wherein said converting includes applying said interpolation technique to said chroma data.

14. The method as recited in claim 10 wherein said first and second video formats are YUV video formats.

15. The method as recited in claim 14 wherein said second video format is a 4:2:0 video format.

16. The method as recited in claim 10 wherein said first video format is a 4:2:2 video format.

* * * * *